United States Patent
Bridge (10) Patent No.: US 7,925,758 B1
(45) Date of Patent: Apr. 12, 2011

(54) FIBRE ACCELERATED PIPE DATA TRANSPORT

(75) Inventor: Craig E. Bridge, New Brighton, MN (US)

(73) Assignee: Symantec Operating Corporation, Mountain View, CA (US)

( * ) Notice: Subject to any disclaimer, the term of this patent is extended or adjusted under 35 U.S.C. 154(b) by 1016 days.

(21) Appl. No.: 11/595,754

(22) Filed: Nov. 9, 2006

(51) Int. Cl.
*G06F 15/177* (2006.01)
*G06F 15/173* (2006.01)

(52) U.S. Cl. ........................... 709/226; 709/220

(58) Field of Classification Search ........... 709/200–253
See application file for complete search history.

(56) References Cited

U.S. PATENT DOCUMENTS

| | | | |
|---|---|---|---|
| 6,085,200 A | 7/2000 | Hill | |
| 6,253,240 B1 | 6/2001 | Axberg | |
| 6,347,342 B1 | 2/2002 | Marcos | |
| 6,353,612 B1 | 3/2002 | Zhu | |
| 6,389,432 B1 | 5/2002 | Pothapragada | |
| 6,400,730 B1 | 6/2002 | Latif | |
| 6,601,187 B1 | 7/2003 | Sicola | |
| 6,606,690 B2 | 8/2003 | Padovano | |
| 6,629,264 B1 * | 9/2003 | Sicola et al. ............. | 714/15 |
| 6,636,239 B1 | 10/2003 | Arquie | |
| 6,640,278 B1 | 10/2003 | Nolan | |
| 6,654,747 B1 | 11/2003 | Van Huben | |
| 6,671,776 B1 | 12/2003 | DeKoning | |
| 6,697,924 B2 | 2/2004 | Swank | |
| 6,714,952 B2 | 3/2004 | Dunham | |
| 6,738,821 B1 | 5/2004 | Wilson et al. | |
| 6,769,022 B1 | 7/2004 | DeKoning | |
| 6,807,181 B1 | 10/2004 | Weschler | |
| 6,826,580 B2 | 11/2004 | Harris | |
| 6,839,750 B1 | 1/2005 | Bauer | |
| 6,854,035 B2 | 2/2005 | Dunham | |
| 6,920,494 B2 | 7/2005 | Heitman | |
| 6,944,654 B1 | 9/2005 | Murphy | |
| 6,947,939 B2 | 9/2005 | Fujibayashi | |
| 6,959,373 B2 | 10/2005 | Testardi | |
| 6,971,044 B2 | 11/2005 | Geng | |
| 7,003,567 B2 | 2/2006 | Suzuki | |
| 7,103,626 B1 | 9/2006 | Recio | |

(Continued)

OTHER PUBLICATIONS

"QLDIRECT QLogic Optimizing and Multipath Driver for Windows NT V4.0 and Windows 2000," (5 Pages), 2000.

(Continued)

*Primary Examiner* — Asad M Nawaz
(74) *Attorney, Agent, or Firm* — Rory D. Rankin; Meyertons, Hood, Kivlin, Kowert & Goetzel, P.C.

(57) ABSTRACT

A system and method for managing data transfers. A system comprises a plurality of nodes and a fabric including at least a first link interconnecting the plurality of nodes. The system allocates a first pipe having a unique first pipe identifier and a second pipe having a unique second pipe identifier within the first link. A first initiator node uses the first link and the first pipe identifier to communicate with a first target node. A second initiator node uses the first link and the second pipe identifier to communicate with a second target node. The system allows concurrent data exchanges via the first and second pipes. The first link comprises a Fibre Channel link. The first and second initiator nodes each comprise at least one SCSI initiator and the first and second target nodes each comprise one or more SCSI logical units coupled to a physical storage medium.

17 Claims, 8 Drawing Sheets

U.S. PATENT DOCUMENTS

| | | |
|---|---|---|
| 7,161,935 B2 | 1/2007 | Alonso |
| 7,194,538 B1 | 3/2007 | Rabe |
| 7,330,897 B2 | 2/2008 | Baldwin |
| 2001/0054093 A1 | 12/2001 | Iwatani |
| 2002/0095602 A1 | 7/2002 | Pherson |
| 2002/0099914 A1 | 7/2002 | Matsunami |
| 2002/0161871 A1 | 10/2002 | Shanthaveeraiah |
| 2002/0194407 A1 | 12/2002 | Kim |
| 2003/0084076 A1 | 5/2003 | Sekiguchi |
| 2003/0085914 A1 | 5/2003 | Takaoka |
| 2003/0105830 A1 | 6/2003 | Pham |
| 2003/0130821 A1 | 7/2003 | Anslow |
| 2003/0140128 A1 | 7/2003 | Cox |
| 2003/0154267 A1 | 8/2003 | Comacho |
| 2003/0154268 A1 | 8/2003 | Sato |
| 2003/0204701 A1 | 10/2003 | Mimatsu |
| 2003/0208589 A1 | 11/2003 | Yamamoto |
| 2003/0220991 A1 | 11/2003 | Soejima |
| 2003/0225993 A1 | 12/2003 | Yagisawa |
| 2004/0006612 A1 | 1/2004 | Jibbe |
| 2004/0022200 A1 | 2/2004 | Grabauskas |
| 2004/0024863 A1 | 2/2004 | Connor et al. |
| 2004/0025166 A1 | 2/2004 | Adlung |

OTHER PUBLICATIONS

"QLogic Software Suite Streamlines SAN Management," FCIA Member Company Press Release, Nov. 9, 1999, (3 Pages).

"The Architecture of Veritas SANPoint Control tm 2.0," Veritas Software Corporation, 2001, (42 Pages).

High Availability Storage Networks with the Cisco MDS 9500 Series of Multilayer Directors, Cisco Systems, Aug. 2002, (14 pages).

Scott Lukes, "Building Bulletproof Security When Connecting SANs over WANs, while maintaining gigabit speeds, presents challenges," InfoStor, Mar. 2002, (7 pages).

StorageWorks Fibre Channel SAN Switch 16-EL, Compaq, Mar. 21, 2002, (6 pages).

U.S. Appl. No. 10/449,797, entitled "SAN Fabric Discovery", filed May 30, 2003.

* cited by examiner

FIBRE ACCELERATED PIPE DATA TRANSPORT

BACKGROUND OF THE INVENTION

1. Field of the Invention

This invention relates to computer data storage systems and, more particularly, to transporting pipe data between computer systems via Fibre Channel using shared SCSI devices.

2. Description of the Related Art

There is an increasing need for organizations to move large datasets efficiently between computer systems. For example, large backup datasets may be moved from a client computer system to a media server configured to store data for later retrieval, thereby protecting data from loss due to user error, system failure, outages, and disasters, etc. as well as archiving information for regulatory compliance, workflow tracking, etc. One common computer system arrangement that involves movement of large datasets from client computers to storage servers includes one or more client computers coupled to a storage area network (SAN). Conventional SANs may interconnect client systems with data storage appliances through a variety of high capacity physical links. One popular interconnect technology for such links is Fibre Channel. Fiber Channel is a set of standards based on high performance serial links and supporting several different higher-level protocols for controlling the movement of data. For instance, Fiber-Distributed Data Interface (FDDI), Small Computer System Interface (SCSI) device protocol, the High Performance Parallel Interface (HIPPI) protocol, the Intelligent Peripheral Interface (IPI) protocol, and other high-level protocol's are often mapped onto Fibre Channel's signaling and data transmission protocols. SCSI over Fibre Channel, sometimes referred to as Fibre Channel Protocol (FCP) has proven to be a popular and effective method of transferring SCSI data blocks between computer systems. In addition, the Fibre Channel architecture may be applied to multiple connection topologies including a single channel point-to-point link, a switched network, and/or an arbitrated loop topology.

Because the higher level protocols that are commonly supported by Fibre Channel do not support multiple concurrent data streams, currently available implementations may not reach the potential transfer speeds of the underlying Fibre Channel links. For example, the SCSI command set assumes packet delivery in accordance with standard sequential behavior. Once a connection is established between an initiator and a target device, any packet received from that initiator is assumed by the target device to be part of a single stream until the connection is ended. Accordingly, current SCSI over Fibre Channel implementations do not support transfer of multiple concurrent data streams on a single Fibre Channel link. In addition, while internet-style protocols such as TCP/IP or similar patterns do support multiple concurrent data streams, these protocols are not widely supported on Fibre Channel systems and require significant software processing to distinguish data streams and ensure data integrity. Even when standards become available for operating TCP/IP over Fibre Channel, these software processing steps may limit performance. As a result, there exists a need for systems and methods for interconnecting client computer systems and data storage devices that overcome the above limitations and make more efficient use of Fibre Channel's available physical bandwidth.

SUMMARY OF THE INVENTION

Various embodiments of a computer system and method are disclosed. In one embodiment, a computer system comprises a plurality of nodes and a fabric comprising at least a first link interconnecting the plurality of nodes. The system is configured to allocate a first pipe having a unique first pipe identifier within the first link and allocate a second pipe having a unique second pipe identifier within the first link. A first initiator node is configured to use the first link and the first pipe identifier to communicate with a first target node. A second initiator node is configured to use the first link and the second pipe identifier to communicate with a second target node. The system is further configured to allow concurrent data exchanges via the first and second pipes.

In a further embodiment, the first link comprises a Fibre Channel link. In a still further embodiment, the first and second initiator nodes each comprise at least one SCSI initiator and the first and second target nodes each comprise one or more SCSI logical units coupled to a physical storage medium.

In a still further embodiment, the first initiator node is configured to send a first command including the first pipe identifier to the first target node. In response to receiving the first command, the first target node is configured to perform a first task. The second initiator node is configured to send a second command including the second pipe identifier to a second target node. In response to receiving the second command, the second target node is configured to perform a second task. In a still further embodiment, at least one of the first task and the second task comprises reading data from a target node and conveying the data to an initiator node or writing data received from an initiator node to a physical storage medium coupled to a target node.

In a still further embodiment, the first command comprises a sequence of frames. Each frame of the sequence causes a segment of a dataset to be exchanged between the first initiator node and the first target node. The segments of the dataset are ordered according to a value of a sequence number included in each frame.

These and other embodiments will become apparent upon reference to the following description and accompanying figures.

While the invention is susceptible to various modifications and alternative forms, specific embodiments are shown by way of example in the drawings and are herein described in detail. It should be understood, however, that drawings and detailed descriptions thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

Figure 1:
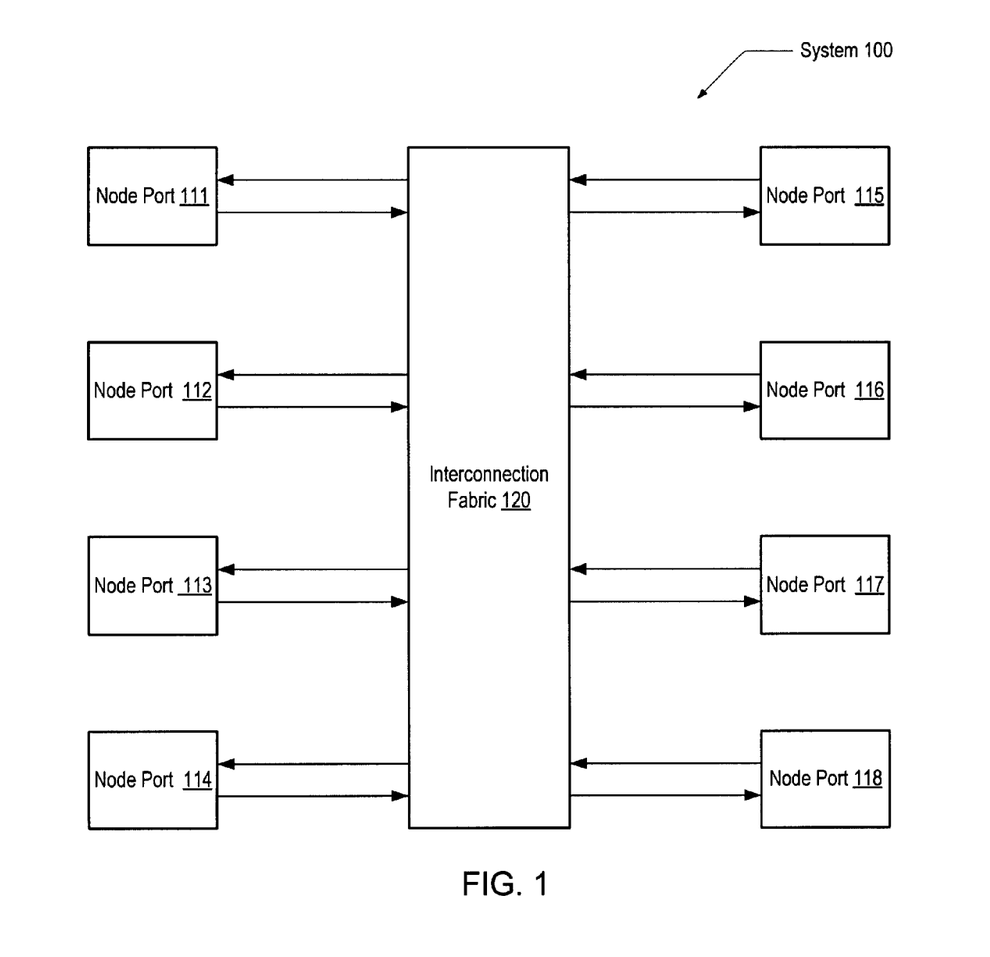
FIG. 1 is a generalized block diagram of one embodiment of a computer node interconnection system.

FIG. 1 is a generalized block diagram of one embodiment of a computer node interconnection system 100. In the illustrated embodiment, node ports 111-118 are coupled to an interconnection fabric 120. For example, fabric 120 may comprise a Fibre Channel switch fabric. Each of node ports 111-118 may be connected to fabric 120 via both a unidirectional output link and a unidirectional input link. Links connecting node ports 111-118 to fabric 120 may comprise either copper or fiber connections. In one embodiment, fabric 120 may switch input and output links dynamically. In an alternative embodiment, fabric 120 may interconnect input and output links to form a loop, with one of the nodes performing loop arbitration. More complex topologies including combinations of loops and switched fabrics are possible and are contemplated.

Figure 2:
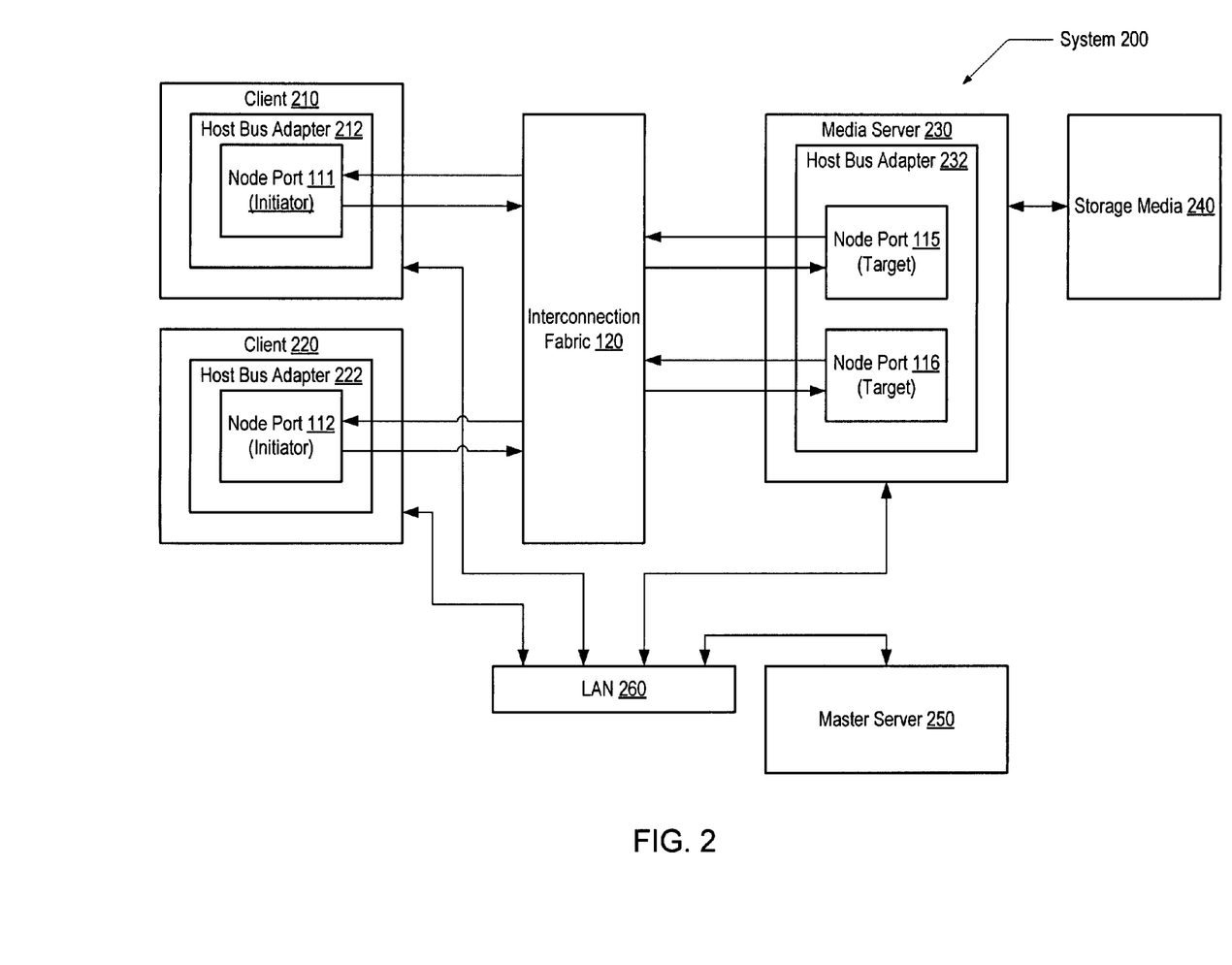
FIG. 2 is a generalized block diagram of one embodiment of a computer system that includes the features of the interconnect system of FIG. 1.

FIG. 2 is a generalized block diagram of one embodiment of a computer system 200 that includes the features of interconnect system 100. In the illustrated embodiment, system 200 includes clients 210 and 220, media server 230, storage media 240, master server 250, and Local Area Network (LAN) 260. Clients 210 and 220 and media server 230 are shown interconnected via fabric 120. Clients 210 and 220 and media server 230 are also shown interconnected via LAN 260 to master server 250. Storage media 240 is shown coupled to media server 230. Client 210 may include a host bus adapter (HBA) 212, which includes a node port 111. Similarly, client 220 may include a host bus adapter (HBA) 222, which includes a node port 112. In alternative embodiments, each client may include more than one HBA and each HBA may include more than one port. Media Server 230 may include an HBA 232, which includes node ports 115 and 116. In alternative embodiments, each media server may include one or more HBA's and each HBA may include one or more ports. Although system 200 is shown to include two clients and a single media server, in alternative embodiments, as will be apparent to one of ordinary skill on the art, system 200 may include a single client or any number of additional clients and any number of additional media servers. In addition, although the media server and the master server are shown as separate devices, in alternative embodiments, they may be incorporated into a single host machine.

During operation, a client may initiate a data transaction with a media server, such as during a backup or restore operation. For example, a client may initiate a write transaction with media server 230 in order to store data on storage media 240 or a read transaction with media server 230 in order to retrieve stored data from storage media 240. A port located on a client that initiates a data transaction may be referred to as an initiator port. A connection may be established between an initiator port and storage media 240 through fabric 120 and a port on media server 230. A port located on a server where data is to be written or from which data is to be retrieved may be referred to as a target port.

Generally speaking, in one embodiment, client and server devices may follow conventional Fibre Channel protocols for login to the fabric such as by transmitting a login frame. In addition, initiator ports may discover target ports and their associated devices by sending one or more inquiry frames onto the fabric. The Fibre Channel fabric may receive, process, and respond to these inquiry frames. In addition, client and server devices may transmit the results of their inquiries to master server 250 over a separate network, such as LAN 260. Master server 250 may provide a monitoring service that controls the use of Fibre Channel paths by maintaining information describing attached clients and servers as well as the ports and associated devices made available for data communication by each client or server. The processes by which Fibre Channel paths are used for data communication will be described further below.

Figure 3:
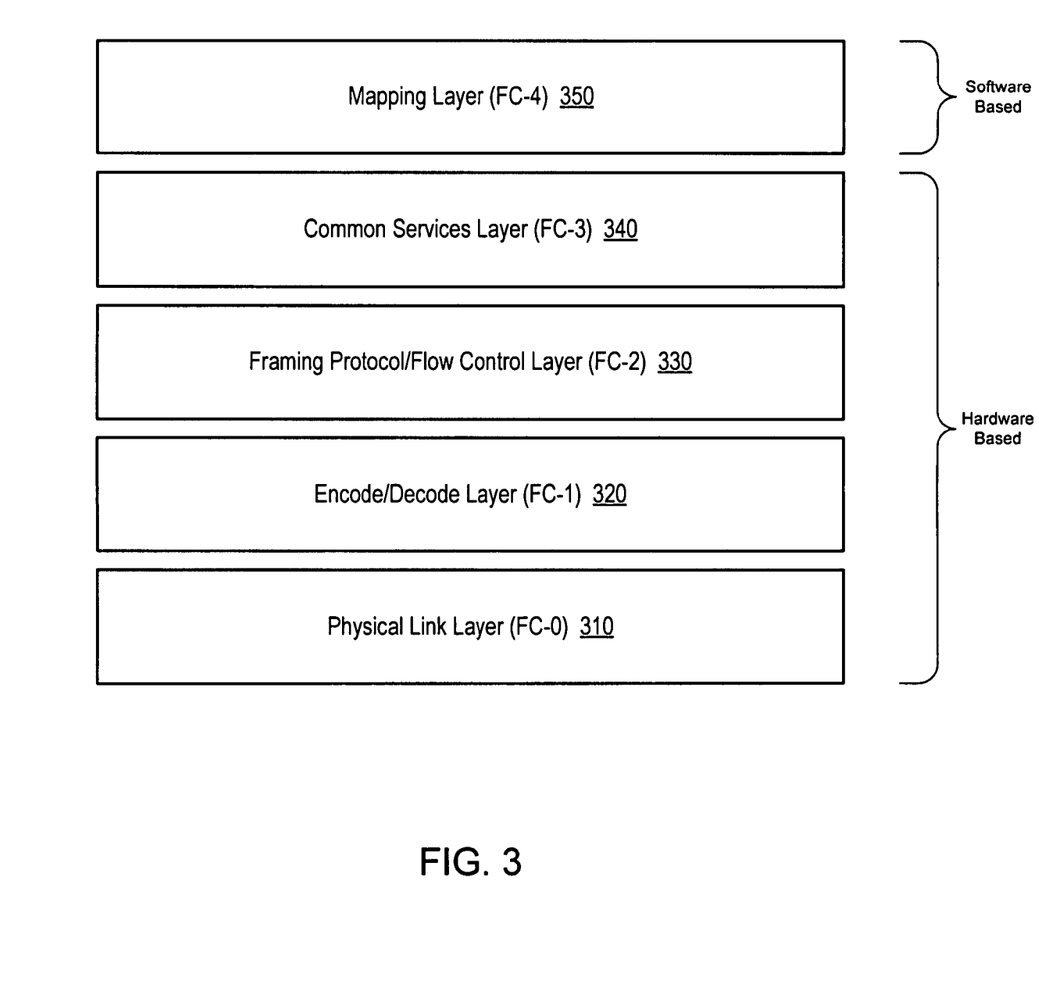
FIG. 3 illustrates one embodiment of a Fibre Channel protocol stack.

FIG. 3 illustrates one embodiment of a Fibre Channel protocol stack. In the illustrated embodiment, the Fibre Channel protocol stack includes layers 310, 320, 330, 340, and 350. Layer 310 may be referred to as the physical link layer or the FC-0 layer. Layer 310 may include the physical media such a fiber-optic cable or copper cable as well as hardware and/or software to control transmission speed, power level, and operational safety, etc. Layer 320 may be referred to as the encode/decode layer or the FC-1 layer. Layer 320 may include hardware and/or software to control encoding and decoding of transmitted data, special characters, and error control, etc. Layer 330 may be referred to as the framing protocol/flow control layer or the FC-2 layer. Layer 330 may include hardware and/or software to control and synchronize Fibre Channel frames, sequences of frames, and exchanges of sequences as well as to pace the flow of frames. Layer 330 may also define service class protocols. Layer 340 may be referred to as the common services layer or the FC-3 layer. Layer 340 may include hardware and/or software to control advanced features such a multicasting, etc. Layer 350 may be referred to as the mapping layer or FC-4 layer. Layer 350 is a software-based layer that defines application interfaces that may execute over Fibre Channel and mapping rules between upper layer applications and the lower Fibre Channel layers. Commonly supported application protocols include Fiber-Distributed Data Interface (FDDI), Small Computer System Interface (SCSI), High Performance Parallel Interface (HIPPI), and Intelligent Peripheral Interface (IPI).

In one embodiment, described further below, a SCSI application protocol is mapped to the lower Fibre Channel layers such that a modified set of SCSI over Fibre Channel commands may be used for exchanging data between SCSI-defined devices. Modifications may be made only to command frames so that the conventional SCSI over Fibre Channel data packet heirarchy such as data frames, sequences consisting of one or more related, unidirectionally transmitted data frames, and exchanges consisting of one or more sequences may be maintained.

Figure 4:
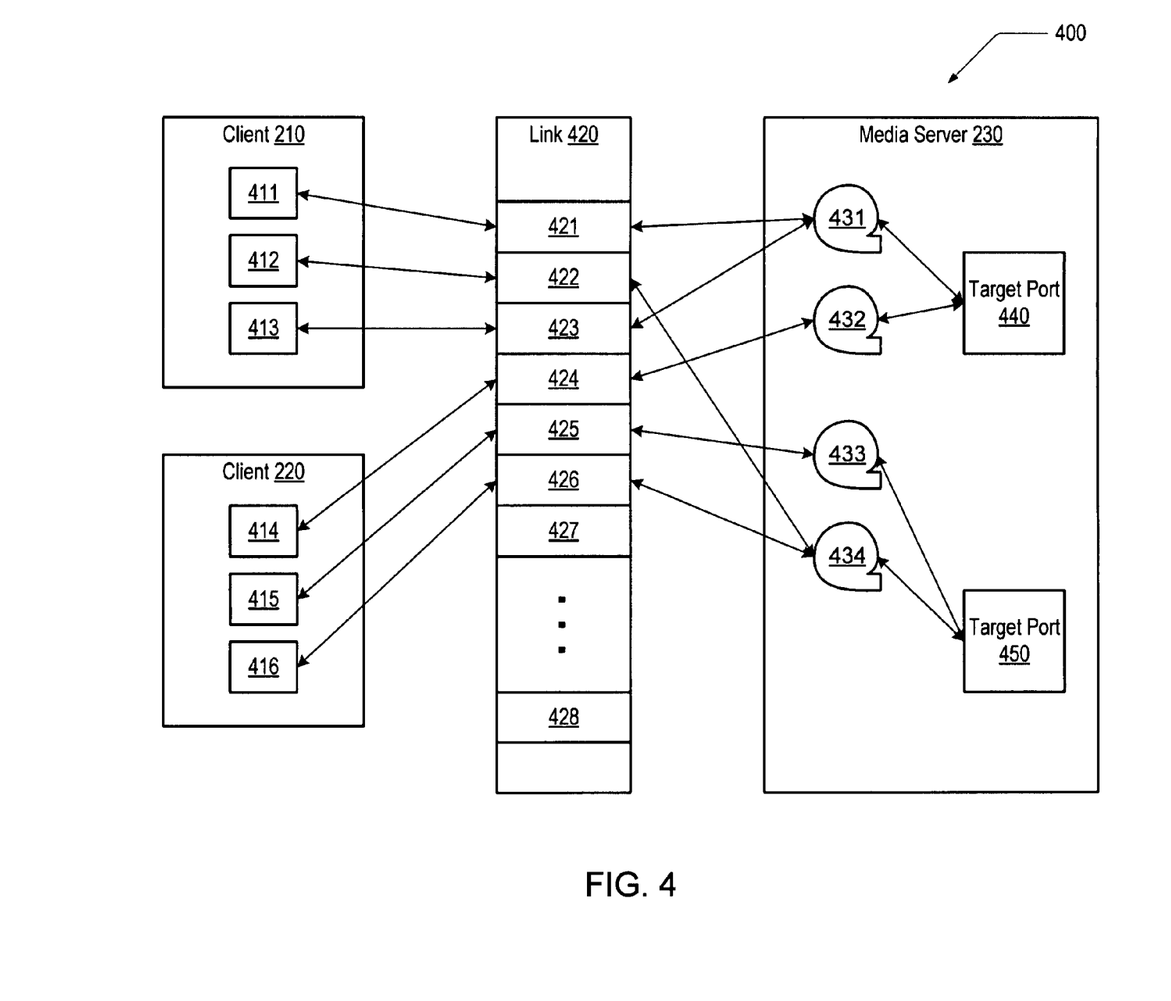
FIG. 4 illustrates one embodiment of a system having a set of pipes that may operate concurrently on a single Fibre Channel link.

FIG. 4 illustrates one embodiment of a system 400 having a set of pipes 421-428 that may operate concurrently on a single Fibre Channel link. Shown are clients 210 and 220 coupled to pipes within link 420, which are in turn coupled to target devices within media server 230. Client 210 includes shared memory buffers 411-413, which may store data that is ready for transmission via a Fibre Channel link or that is received from a Fibre Channel link. Client 220 includes shared memory buffers 414-416, which may also store data that is ready for transmission via a Fibre Channel link or that is received from a Fibre Channel link. Media server 230 includes target ports 440 and 450. Target port 440 is associated with logical unit numbers (LUN) 431 and 432. Target port 450 is associated with LUNs 433 and 434. Link 420 includes individual pipes 421-428. A master server, such as master server 250 as shown in FIG. 2, may coordinate the use of pipes including how many pipes are available on a given Fibre Channel link and the assignment of pipes for use by specific client buffers and specific LUNs.

Generally speaking, in accordance with the conventional SCSI over Fibre Channel protocol, each target port may advertise the availability of one or more logical devices. A client may initiate a communication with one or more of the advertised LUNs through one or more initiator ports connected to the Fibre Channel infrastructure. More specifically, in one embodiment, target port 440 advertises LUNs 431 and 432 and target port 450 advertises LUNs 433 and 434. Clients may discover the available LUNs by sending inquiries to the Fibre Channel fabric. In one embodiment, the results of such inquiries are transmitted to master server 250. Similarly, media servers may transmit information to master server 250 describing the target LUNs that they advertise to the Fibre Channel. To obtain a connection between a buffer and a LUN using the resources available within a Fibre Channel link, each client may send a request to master server 250. In the embodiment illustrated in FIG. 4, pipes 421-428 within link 420 are available for data transfers between buffers 411-416 and LUNS 431-434. FIG. 4 illustrates a particular configuration in which buffer 411 may exchange data with LUN 431 through a pipe 421, buffer 412 may exchange data with LUN 434 through a pipe 422, buffer 413 may exchange data with LUN 431 through a pipe 423, buffer 414 may exchange data with LUN 432 through a pipe 424, buffer 415 may exchange data with LUN 433 through a pipe 425, and buffer 416 may exchange data with LUN 434 through a pipe 426. These and a variety of other exchanges may be configured by master server 250.

The example of FIG. 4 illustrates a number of properties of a Fibre Channel system using pipes. For instance, it is noted that a LUN may be the target of one or more concurrent exchanges from a corresponding one or more pipes and client buffers. Further, one or more clients may concurrently use a single set of pipes within a single Fibre Channel link to exchange data with one or more LUNs. Each target port may advertise the availability of one or more LUNs. Each client may target LUNs that are associated with one or more target ports using a single set of pipes.

Figure 5:
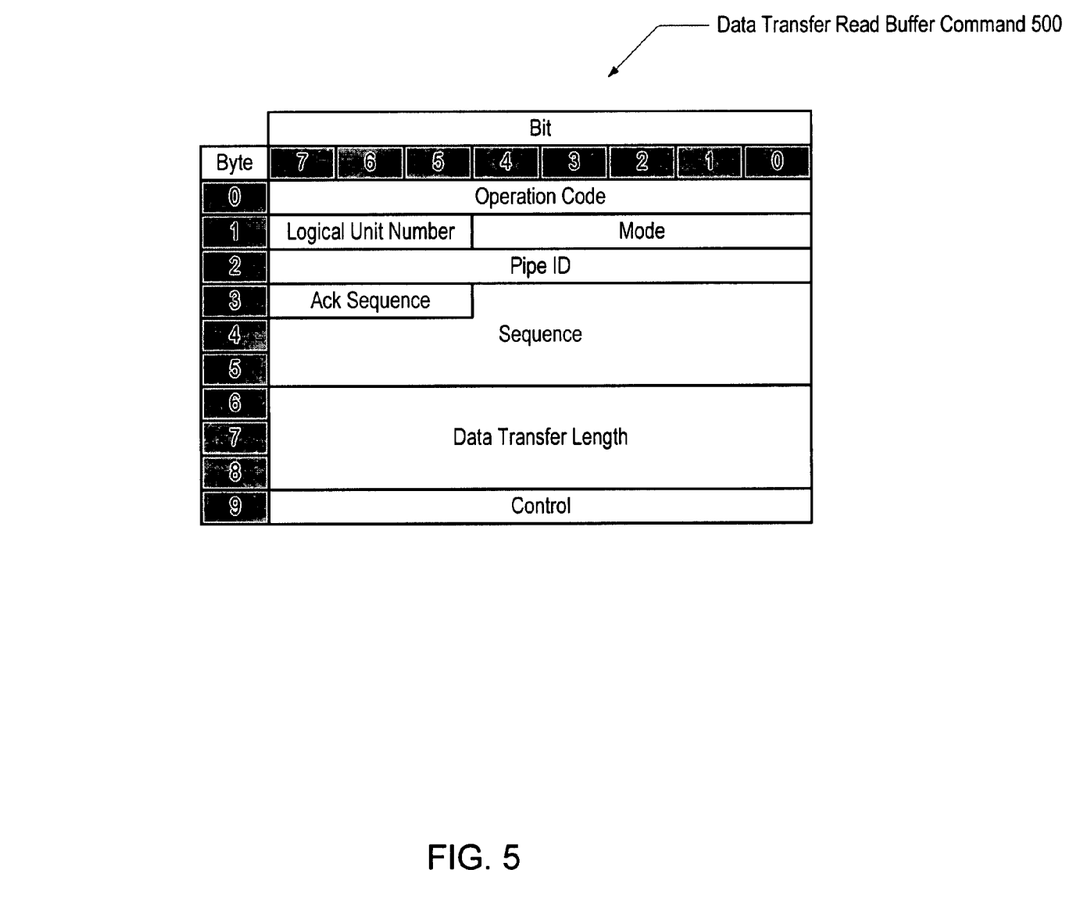
FIG. 5 illustrates one embodiment of a READ BUFFER command frame that may be used to transfer data in a Fibre Channel system using pipes.

FIG. 5 illustrates one embodiment of a READ BUFFER command frame 500 that may be used to transfer data in a Fibre Channel system using pipes. In a conventional SCSI over Fibre Channel system, a READ BUFFER command frame may be used as a diagnostic function for testing target memory and the integrity of Fibre Channel links. In the illustrated embodiment, the functions of the fields may be as follows. Byte 0 represents an operation code that may be set to hexadecimal '3C' to indicate that frame 500 is a READ BUFFER command frame. Bits 0-4 of byte 1 may be set to hexadecimal '2' to indicate that frame 500 is a request to transfer data. Bits 5-7 of byte 1 may be set to a value identifying the target LUN of frame 500. Byte 2 may be set to a value identifying the pipe to be used during the requested read operation. Bits 0-7 of byte 5, bits 0-7 of byte 4, and bits 0-4 of byte 3 represent a 21-bit modulo sequence number that may be used to determine the relative position of a frame within a multiple-frame sequence. Bits 5-7 of byte 3 represent a 3-bit modulo acknowledgement sequence number that may be used to signal to a target which of a sequence of frames of data has been received by an initiator during a multi-frame read sequence. Bytes 6-8 may be set to a 24-bit value indicating the length of a sequence of data frames that is to be read. Byte 9 may include bits for linking multiple frame commands as well as bits reserved for vendor-specific functions.

During operation, after master server 250 has received information from clients and servers identifying themselves as being available on the Fibre Channel, a client may send a request for a connection to a target LUN to master server 250 and receive in return the information necessary to compose a READ BUFFER command frame according to the above protocol. For example, in one embodiment, the master server may return a pipe identifier of a pipe that may be used to communicate with the target LUN. If a large dataset is to be exchanged, the initiator may send a linked sequence of commands to the target LUN. The initiator client may maintain the sequence number and acknowledgement sequence number and specify the operation code, mode, and data transfer length that apply to the desired data exchange. After each READ BUFFER command frame has been received and acknowledged by the target LUN, a data phase may be entered in which one segment of the dataset may be read from the target.

Figure 6:
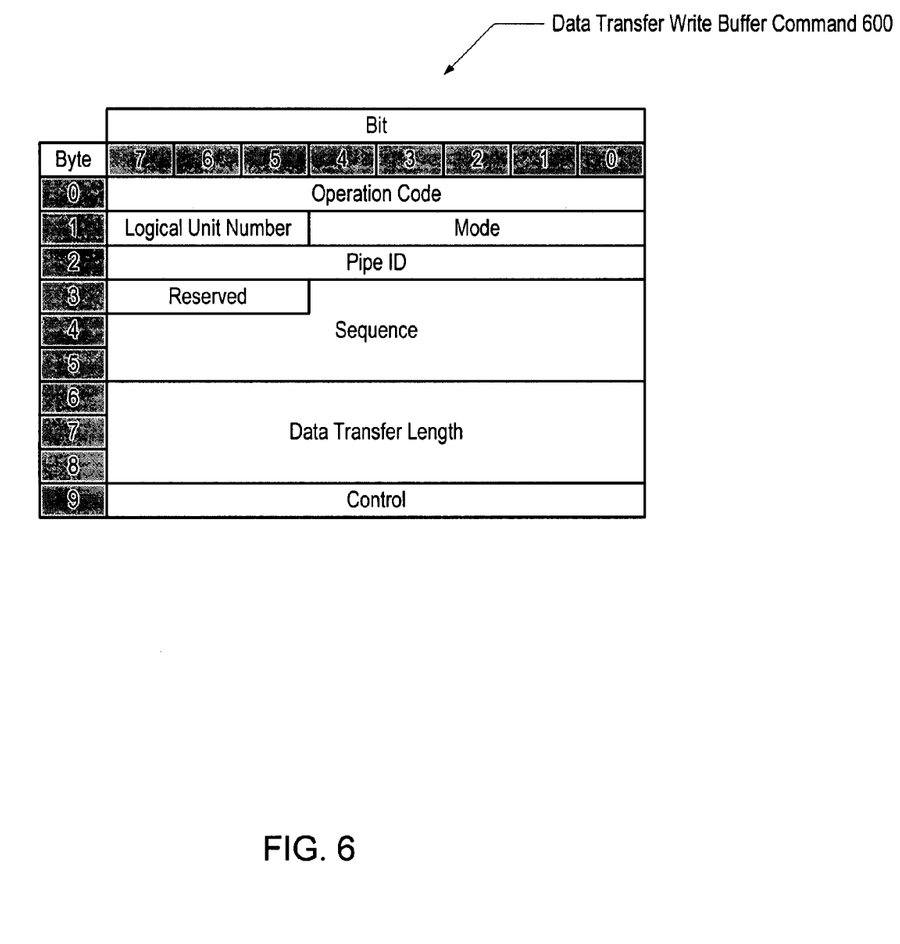
FIG. 6 illustrates one embodiment of a WRITE BUFFER command frame that may be used to transfer data in a Fibre Channel system using pipes.

FIG. 6 illustrates one embodiment of a WRITE BUFFER command frame 600 that may be used to transfer data in a Fibre Channel system using pipes. In a conventional SCSI over Fibre Channel system, a WRITE BUFFER command frame may be used in conjunction with the above described READ BUFFER command frame as a diagnostic function for testing target memory and the integrity of Fibre Channel links. In the illustrated embodiment, the functions of the fields may be as follows. Byte 0 represents an operation code that may be set to hexadecimal '3B' to indicate that frame 500 is a WRITE BUFFER command frame. Bits 0-4 of byte 1 may be set to hexadecimal '2' to indicate that frame 500 is a request to transfer data. Bits 5-7 of byte 1 may be set to a value identifying the target LUN of frame 500. Byte 2 may be set to a value identifying the pipe to be used during the requested write operation. Bits 0-7 of byte 5, bits 0-7 of byte 4, and bits 0-4 of byte 3 represent a 21-bit modulo sequence number that may be used to determine the relative position of a frame within a multiple-frame sequence. Bytes 6-8 may be set to a 24-bit value indicating the length of a sequence of data frames that is to be read. Byte 9 may include bits for linking multiple frame commands as well as bits reserved for vendor-specific functions.

During operation, after master server 250 has received information from clients and servers identifying themselves as being available on the Fibre Channel, a client may send a request for a connection to a target LUN to master server 250 and receive in return the information necessary to compose a WRITE BUFFER command frame according to the above protocol. For example, in one embodiment, the master server may return a pipe identifier of a pipe that may be used to communicate with the target LUN. If a large dataset is to be exchanged, the initiator may send a linked sequence of commands to the target LUN. The initiator client may maintain the sequence number and specify the operation code, mode, and data transfer length that apply to the desired data exchange. After each WRITE BUFFER command frame has been received and acknowledged by the target LUN, a data phase may be entered in which one segment of the dataset may be written to the target.

In the above descriptions of FIGS. 5 and 6, command frames and the functions of their fields are described to illustrate the parameters that may be used to establish an SCSI nexus from a buffer within an initiator client through a pipe within a Fibre Channel link, to a LUN associated with a target port within a media server. However, in alternative embodiments, any of a variety of SCSI-commands and/or non-SCSI compliant commands may be used to configure the transfer of data through multiple pipes by multiple initiators operating concurrently.

Figure 7:
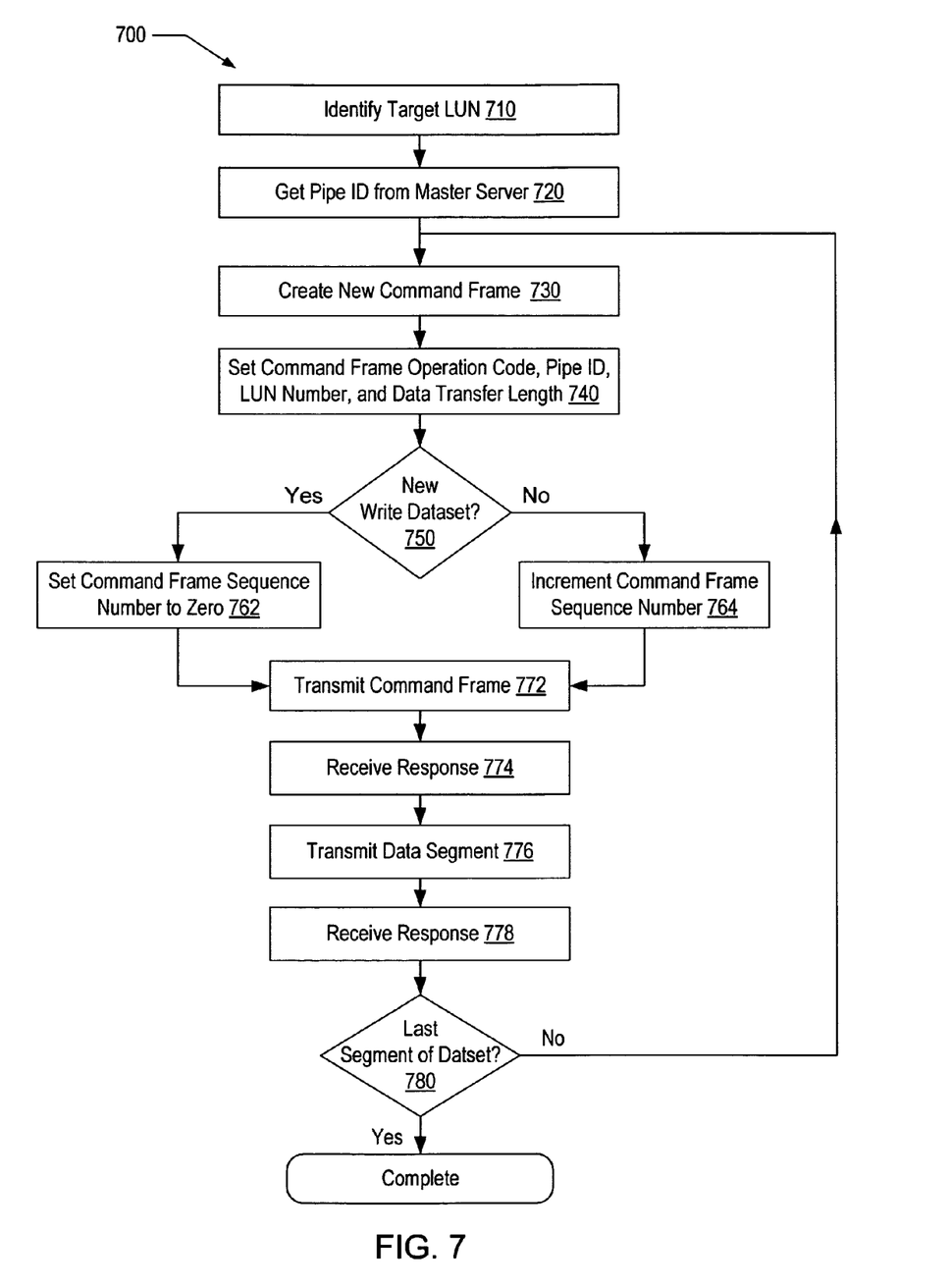
FIG. 7 illustrates one embodiment of a process that may be used to configure and control a write data exchange between an initiator and a target using pipes.

FIG. 7 illustrates one embodiment of a process 700 that may be used to configure and control a write data exchange between an initiator and a target using pipes. An initiator may begin the exchange by identifying a target LUN (block 710). Given a target LUN, the initiator may next get a pipe ID from the master server (block 720). Once the target LUN and pipe ID are known a command frame may be created (block 730). An operation code, the pipe ID, the LUN number, and the data transfer length may then be added to the command frame (block 740). If the initiator is creating a command frame to write a new dataset (decision block 750), then the command frame sequence number may be set to zero (block 762). Otherwise, the command frame sequence number may be incremented from it's previous value (block 764). Once all of the fields of a command frame have been filled, the command frame may be transmitted (block 772). A response acknowledging the command frame may be received (block 774). In response to the acknowledgement, a data segment may be transmitted (block 776) and a response received in return (block 778). If the data segment was the last segment of a dataset (decision bock 780), the data exchange is complete. If not, a new command frame may be created (block 730) and the process repeated until all segments of the dataset have been written.

Figure 8:
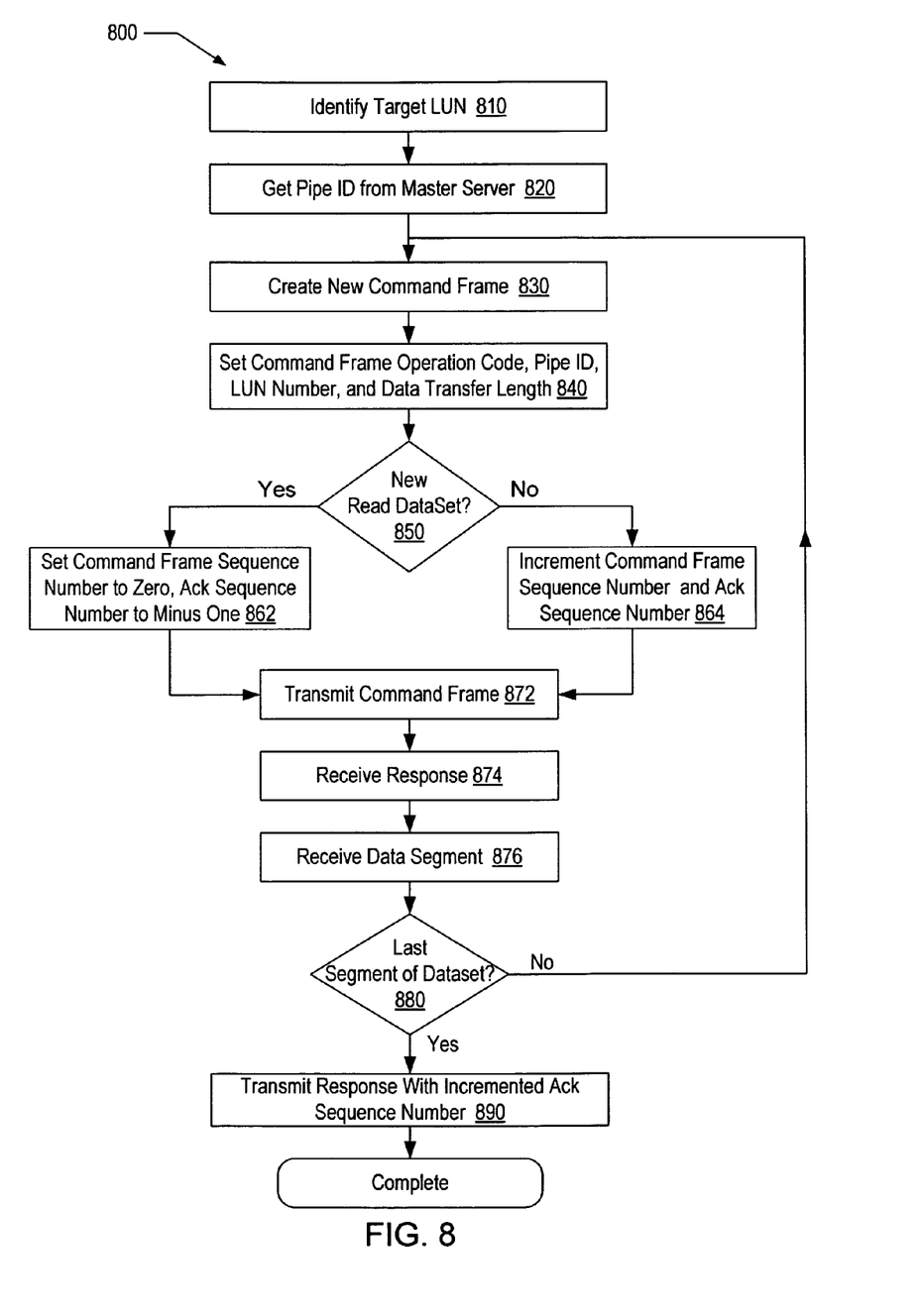
FIG. 8 illustrates one embodiment of a process that may be used to configure and control a read data exchange between an initiator and a target using pipes.

FIG. 8 illustrates one embodiment of a process 800 that may be used to configure and control a read data exchange between an initiator and a target using pipes. An initiator may begin the exchange by identifying a target LUN (block 810). Given a target LUN, the initiator may next get a pipe ID from the master server (block 820). Once the target LUN and pipe ID are known a command frame may be created (block 830). An operation code, the pipe ID, the LUN number, and the data transfer length may then be added to the command frame (block 840). If the initiator is creating a command frame to read a new dataset (decision block 850), then the command frame sequence number may be set to zero and the acknowledgment sequence number set to minus one (block 862). Otherwise, the command frame sequence number and acknowledgment sequence number may be incremented from their previous values (block 864). Once all of the fields of a command frame have been filled, the command frame may be transmitted (block 872). A response acknowledging the command frame may be received (block 874). In addition, a data segment may be received (block 876). If the data segment is the last segment of a dataset (decision bock 880), the acknowledgment sequence number may be incremented and included in a transmitted response (block 890), after which the data exchange is complete. If not, a new command frame may be created (block 830) and the process repeated until all segments of the dataset have been read.

In the above descriptions of FIGS. 7 and 8, processes are described as a sequence of steps executed in a particular order for ease of understanding. However, in alternative embodiments, the steps may be executed in a different order. Also, in some embodiments, some of the steps in a sequence may be executed simultaneously or in parallel.

It is noted that the above described embodiments may comprise software. In such an embodiment, the program instructions which implement the methods and/or mechanisms may be conveyed or stored on a computer accessible medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage. Still other forms of media configured to convey program instructions for access by a computing device include terrestrial and non-terrestrial communication links such as network, wireless, and satellite links on which electrical, electromagnetic, optical, or digital signals may be conveyed. Thus, various embodiments may further include receiving, sending or storing instructions and/or data implemented in accordance with the foregoing description upon a computer accessible medium.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A computer system comprising:
   a plurality of nodes;
   a fabric comprising at least a Fibre Channel link; and
   a master server coupled to the plurality of nodes via a network separate from the fabric and configured to coordinate allocation of pipes;
   wherein the system is configured to:
      allocate a first pipe having a unique first pipe identifier for use in transporting a first data stream within the Fibre Channel link, wherein a first initiator node is configured to use the Fibre Channel link and the unique first pipe identifier to communicate with a first target node;
      allocate a second pipe having a unique second pipe identifier for use in transporting a second data stream within the Fibre Channel link, wherein a second initiator node is configured to use the Fibre Channel link and the unique second pipe identifier to communicate with a second target node; and
   wherein the unique first pipe identifier and the unique second pipe identifier are used to distinguish data corresponding to the first data stream from data corresponding to the second data stream within the Fibre Channel link, thereby allowing concurrent data exchanges via the first pipe and second pipe via the Fibre Channel link.

2. The computer system of claim 1, wherein the first and second initiator nodes each comprise at least one SCSI initiator and the first and second target nodes each comprise one or more SCSI logical units coupled to a physical storage medium.

3. The computer system of claim 1,
   wherein the first initiator node is configured to send a first command including the first pipe identifier to the first target node, and the first target node is configured to perform a first task in response to receiving the first command; and
   wherein the second initiator node is configured to send a second command including the second pipe identifier to a second target node, and the second target node is configured to perform a second task in response to receiving the second command.

4. The computer system of claim 3, wherein at least one of the first task and the second task comprises one of:
   reading data from a target node and conveying the data to an initiator node; and
   writing data received from an initiator node to a physical storage medium coupled to a target node.

5. The computer system of claim 3, wherein the first command comprises a sequence of frames, each frame causing a segment of a dataset to be exchanged between the first initiator node and the first target node, wherein the segments of the dataset are ordered according to a value of a sequence number included in each frame.

6. The computer system of claim 1, further comprising one or more clients, wherein each client comprises one or more initiator nodes of the plurality of nodes.

7. The computer system of claim 6, wherein a first client includes the first initiator node and the second initiator node.

8. The computer system of claim 1, further comprising a media server coupled to at least one storage medium, wherein the media server includes the first and the second target nodes.

9. The computer system of claim 8, wherein the media server and the master server are located on separate host machines.

10. A data transfer method comprising:
- interconnecting a plurality of nodes via a fabric including at least a first link, wherein the first link is a Fibre Channel link;
- coupling a master server to the plurality of nodes via a network separate from the fabric, the master server being configured to coordinate allocation of pipes;
- allocating a first pipe having a unique first pipe identifier for use in transporting a first data stream within the first link;
- a first initiator node using the first link and the unique first pipe identifier to communicate with a first target node;
- allocating a second pipe having a unique second pipe identifier for use in transporting a second data stream within the first link;
- a second initiator node using the first link and the unique second pipe identifier to communicate with a second target node; and
- using the unique first pipe identifier and the unique second pipe identifier to distinguish data corresponding to the first data stream from data corresponding to the second data stream within the Fibre Channel link, thereby allowing concurrent data exchanges via the first pipe and second pipe via the Fibre Channel link.

11. The method of claim 10, wherein the first and second initiator nodes each comprise at least one SCSI initiator and the first and second target nodes each comprise one or more SCSI logical units coupled to a physical storage medium.

12. The method of claim 10, further comprising:
- the first initiator node sending a first command including the unique first pipe identifier to the first target node;
- the first target node performing a first task in response to receiving the first command;
- the second initiator node sending a second command including the unique second pipe identifier to a second target node; and
- the second target node performing a second task in response to receiving the second command.

13. The method of claim 12, wherein at least one of the first task and the second task comprises one of:
- reading data from a target node and conveying the data to an initiator node; and
- writing data received from an initiator node to a physical storage medium coupled to a target node.

14. The method of claim 12, wherein the first command comprises a sequence of frames, each frame causing a segment of a dataset to be exchanged between the first initiator node and the first target node, the method further comprising:
- including a sequence number in each frame; and
- ordering the segments of the dataset according to a value of the sequence number included in each frame.

15. In a computer system comprising a plurality of nodes, a non-transitory computer readable storage medium storing instructions, wherein the instructions are executable by a processor to:
- enable a master server coupled to the plurality of nodes via a network separate from a fabric to coordinate allocation of pipes, wherein the plurality of nodes are interconnected via the fabric including at least a first link, wherein the first link is a Fibre Channel link;
- allocate a first pipe having a unique first pipe identifier for use in transporting a first data stream within the first link;
- cause a first initiator node to use the first link and the unique first pipe identifier to communicate with a first target node;
- allocate a second pipe having a unique second pipe identifier for use in transporting a second data stream within the first link;
- cause a second initiator node to use the first link and the unique second pipe identifier to communicate with a second target node; and
wherein the unique first pipe identifier and the unique second pipe identifier are used to distinguish data corresponding to the first data stream from data corresponding to the second data stream within the Fibre Channel link, thereby allowing concurrent data exchanges via the first pipe and second pipe via the Fibre Channel link.

16. The non-transitory computer readable medium of claim 15, wherein the first and second initiator nodes each comprise at least one SCSI initiator and the first and second target nodes each comprise one or more SCSI logical units coupled to a physical storage medium.

17. The non-transitory computer readable medium of claim 15, containing further instructions executable by a processor to:
- cause the first initiator node to send a first command including the unique first pipe identifier to the first target node;
- cause the first target node to perform a first task in response to receiving the first command;
- cause the second initiator node to send a second command including the unique second pipe identifier to a second target node; and
- cause the second target node to perform a second task in response to receiving the second command;
- wherein at least one of the first task and the second task comprises one of:
  - reading data from a target node and conveying the data to an initiator node; and
  - writing data received from an initiator node to a physical storage medium coupled to a target node.

* * * * *